US00RE50445E

(19) United States
(12) Reissued Patent
Cheng et al.

(10) Patent Number: US RE50,445 E
(45) Date of Reissued Patent: May 27, 2025

(54) METHOD FOR SCANNING MULTIPLE BARCODES AND SYSTEM THEREOF

(71) Applicant: GETAC TECHNOLOGY CORPORATION, Hsinchu County (TW)

(72) Inventors: Shih-Hui Cheng, Taipei (TW); Chun-Yu Kuo, Taipei (TW); Yeh-Sheng Chen, Taipei (TW)

(73) Assignee: Getac Technology Corporation, Hsinchu Cnty (TW)

(21) Appl. No.: 17/960,055

(22) Filed: Oct. 4, 2022

Related U.S. Patent Documents

Reissue of:

(64) Patent No.: 10,853,611
Issued: Dec. 1, 2020
Appl. No.: 16/550,138
Filed: Aug. 23, 2019

(51) Int. Cl.
*G06K 7/14* (2006.01)
*G06K 7/10* (2006.01)

(52) U.S. Cl.
CPC ..... *G06K 7/1417* (2013.01); *G06K 7/10722* (2013.01); *G06K 7/1413* (2013.01); *G06K 7/1443* (2013.01)

(58) Field of Classification Search
CPC ..... G06K 7/1417; G06K 7/10722; G06K 7/1443; G06K 7/1413
See application file for complete search history.

(56) References Cited

U.S. PATENT DOCUMENTS 5,239,622 A * 8/1993 Best ..... G06K 17/0022 358/1.13
5,481,098 A * 1/1996 Davis ..... G06K 7/14 235/462.07
6,119,941 A * 9/2000 Katsandres ..... G06K 7/10851 235/462.07

(Continued)

OTHER PUBLICATIONS

About SimulScan [online], retrieved Oct. 3, 2022, retrieved from URL<https://web.archive.org/web/20170804205047/http://techdocs.zebra.com/simulscan/1-1/guide/about/>, 6 pages.

(Continued)

*Primary Examiner* — Jalatee Worjloh
(74) *Attorney, Agent, or Firm* — Pillsbury Winthrop Shaw Pittman LLP

(57) ABSTRACT

A method for scanning multiple barcodes is provided. A tag template, recording a predetermined number of barcode forms and relative configuration orientations of the predetermined number of barcode forms, is read. The tag is photographed to obtain a tag image of the tag, wherein a surface of the tag includes a plurality of barcodes. The tag image is analyzed to obtain barcode patterns of the barcodes in the tag image, and barcode types and relative coordinates of the barcode patterns. The barcode types of the barcode patterns and the relative coordinates of the barcode patterns are detected according to the tag template to identify from the barcode patterns a predetermined number of barcode patterns to be outputted matching the tag template. The barcode patterns to be outputted are decoded to obtain information respectively represented by the barcode patterns to be outputted, and the information obtained is outputted.

14 Claims, 5 Drawing Sheets

(56) References Cited

U.S. PATENT DOCUMENTS

| | | | | |
|---|---|---|---|---|
| 6,550,685 | B1 * | 4/2003 | Kindberg | G06K 19/06028 235/462.01 |
| 7,546,949 | B1 * | 6/2009 | Blanford | G06K 7/10 235/375 |
| 7,571,171 | B1 | 8/2009 | Shaw | |
| 8,489,414 | B2 | 7/2013 | McEachern | |
| 8,577,884 | B2 | 11/2013 | Poteet et al. | |
| 8,983,972 | B2 | 3/2015 | Kriebel et al. | |
| 9,015,073 | B2 | 4/2015 | Mirra et al. | |
| 9,460,444 | B2 | 10/2016 | Hao et al. | |
| 9,483,768 | B2 | 11/2016 | Singh | |
| 2003/0085284 | A1 * | 5/2003 | Bremer | G06K 7/10871 235/462.32 |
| 2005/0202390 | A1 | 9/2005 | Allen | |
| 2006/0056707 | A1 * | 3/2006 | Suomela | G06K 7/10712 382/232 |
| 2007/0288246 | A1 | 12/2007 | Ebert | |
| 2009/0106371 | A1 | 4/2009 | Schmidt-Karaca et al. | |
| 2009/0327854 | A1 | 12/2009 | Chhajer et al. | |
| 2011/0137808 | A1 | 6/2011 | Meyer et al. | |
| 2011/0290878 | A1 * | 12/2011 | Sun | G06K 7/1473 235/462.07 |
| 2011/0290880 | A1 * | 12/2011 | Cai | G06K 7/1417 235/462.11 |
| 2013/0153662 | A1 * | 6/2013 | Narasa Prakash | G06K 7/1486 235/462.07 |
| 2014/0231522 | A1 * | 8/2014 | Miyasaka | H04N 1/40 235/462.25 |
| 2015/0178458 | A1 | 6/2015 | Pellinat et al. | |
| 2018/0239747 | A1 | 8/2018 | Bills et al. | |

OTHER PUBLICATIONS

YouTube SimulScan Document Capture Overview [online], retrieved Oct. 3, 2022, retrieved from URL<https://www.youtube.com/watch?v=PQ8gPtY7Z3M>, 3 pages.

Template Builder [online], retrieved Oct. 3, 2022, retrieved from URL<https://web.archive.org/web/20170806000917/http://techdocs.zebra.com/simulscan/1-1/guide/templatebuilder/>, 21 pages.

YouTube SimulScan Template Buildinger [online], retrieved Oct. 3, 2022, retrieved from URL<https://youtu.be/-A0pz-EM6mQ>, 3 pages.

YouTube Zebra SimulScan Template Builder Tutorial [online], retrieved Oct. 3, 2022, retrieved from URL<https://www.youtube.com/watch?v=GwcPT9sUAus>, 3 pages.

Panasonic.com [online], "Toughbook A3", retrieved Oct. 3, 2022, retrieved from URL<https://na.panasonic.com/us/computers-tablets-handhelds/tablets/tablets/toughbook-a3>, 10 pages.

Virtualroundtables.com [online], "Toughbook Supply Chain Solutions", retrieved Oct. 3, 2022, retrieved from URL<https://www.virtualroundtables.com/wp-content/uploads/2021/01/TOUGHBOOK-Supply-Chain-Solutions-Jun-2020-v2-1.pdf>, 40 pages.

Panasonic.com [online], retrieved Oct. 3, 2022, retrieved from URL<https://na.panasonic.com/ns/277597_PSS_M201455SS_TB-A3_SS_R6_FINAL.pdf>, 2 pages.

Scandit.com [online], retrieved Oct. 3, 2022, retrieved from URL<https://docs.scandit.com/data-capture-sdk/ios/requirements/6.6.html>, 2 pages.

Panasonic.com [online], retrieved Oct. 3, 2022, retrieved from URL<https://na.panasonic.com/us/computers-tablets-handhelds/tablets/tablets/toughbook-a3>, 10 pages.

Panasonic.com [online], "The Right Tools For Every Utilities Specialist", retrieved Oct. 3, 2022, retrieved from URL<https://business.panasonic.co.uk/mobile-solutions/utilities/usage-applications.php>, 7 pages.

"May 2020 Build 5.6.2" [online], retrieved Oct. 3, 2022, retrieved from URL<May 2020 | Build 5.6.2 : ShopperKit Support>, 6 pages.

zdnet.com [online], "Panasonic unveils Toughbook A3 rugged tablet, productivity+ Android software suite", retrieved Oct. 3, 2022, retrieved from URL<https://www.zdnet.com/article/panasonic-unveils-toughbook-a3-rugged-tablet-productivity-plus-android-software-suite/> 5 pages.

"Barcode Selection" [online], "Barcode Selection" retrieved Oct. 3, 2022, retrieved from URL<https://docs.scandit.com/data-capture-sdk/ios/barcode-capture/api/barcode-selection.html#class-scandit.datacapture.barcode.selection.BarcodeSelection>, 4 pages.

"Get Started With Barcode Selection" [online] retrieved Oct. 3, 2022, retrieved from URL<https://docs.scandit.com/data-capture-sdk/ios/get-started-barcode-selection.html>, 6 pages.

"ScanditLabel Capture" [online], retrieved Oct. 3, 2022, retrieved from URL<https://docs.scandit.com/data-capture-sdk/ios/label-capture/overview.html>, 2 pages.

"About DataWedge" [online], retrieved Oct. 3, 2022, retrieved from URL<https://techdocs.zebra.com/datawedge/11-1/guide/about/>, 21 pages.

YouTube "MultiBarcode—Read Specific Barcodes with DataWedge" [online], retrieved Oct. 3, 2022, retrieved from URL<https://www.youtube.com/watch?v=5Kr8h-Cke6k>, 3 pages.

"Barcode Input" [online], retrieved Oct. 3, 2022, retrieved from URL<https://techdocs.zebra.com/datawedge/11-1/guide/input/barcode/#documentselectiondocumentcapture>, 53 pages.

"Document Capture Programmer's Guide" [online], retrieved Oct. 3, 2022, retrieved from URL<https://techdocs.zebra.com/datawedge/11-1/guide/programmers-guides/ng-simulscan/>, 3 pages.

"Content Provider Programmer's Guide" [online], retrieved Oct. 3, 2022, retrieved from URL<https://techdocs.zebra.com/datawedge/11-1/guide/programmers-guides/content-provider/>, 14 pages.

* cited by examiner

METHOD FOR SCANNING MULTIPLE BARCODES AND SYSTEM THEREOF

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

Field of the Invention

The present invention relates to a method for scanning multiple barcodes and a system thereof, and more particularly to a method capable of scanning multiple barcodes all at once and a system thereof.

Description of the Prior Art

A barcode refers to a patterned identification element that represents a set of information by using multiple black strips and blank spaces of different widths arranged according to a predetermined coding means. Common barcodes include one-dimensional barcodes and two-dimensional barcodes. A one-dimensional barcode can represent information of tens of characters, and a two-dimensional barcode can even represent information of thousands of characters. With a barcode, information such as the country of production, manufacturer, name of product, date of production, book of classification, origin and destination of mailing, and type and date of an object can be labelled. Therefore, barcodes are extensively applied in many fields including commodity circulation, book management, postal management, and banking systems.

Accompanied by the ever-expanding demand in the amount of information, multiple barcodes are used to represent such information. However, in the presence of multiple barcodes, a user is required to manually determine the sequences of scanning so as to determine the sequences of outputting information, resulting in substantial inconvenience in use and time delay.

SUMMARY OF THE INVENTION

In view of the above, the present invention provides a method for scanning multiple barcodes and a system thereof, which are capable of obtaining information in multiple barcodes according to user requirements in a most convenient and quick manner.

In one embodiment, a method for scanning multiple barcodes includes: reading a tag template, wherein the tag template records a predetermined number of barcode forms and relative configuration orientations of the barcode forms, and the predetermined number is a positive integer and is greater than 1; photographing a tag to obtain a tag image of the tag, wherein a surface of the tag includes a plurality of barcodes; analyzing the tag image to obtain barcode patterns of the barcodes in the tag image, barcode types of the barcode patterns, and relative coordinates of the barcode patterns; detecting barcode types of the barcode patterns and relative coordinates of the barcode patterns according to the barcode forms and the relative configuration orientations to identify from the barcode patterns a predetermined number of barcode patterns to be outputted matching the barcode forms and the relative configuration orientations; decoding the barcode patterns to be outputted to obtain information respectively represented by the barcode patterns to be outputted; and outputting the information obtained.

In one embodiment, a system for scanning multiple barcodes includes a storage unit, a photographing unit, a processing unit and a display unit. The storage unit stores a tag template, wherein the tag template records a predetermined number of barcode forms and relative configuration orientations of the barcode forms, and the predetermined number is a positive integer and greater than 1. The photographing unit photographs a tag to capture a tag image of the tag. The processing unit, coupled to the storage unit and the photographing unit, reads the tag template, analyzes the tag image to obtain barcode patterns of the barcodes in the tag image, barcode types of the barcode patterns, and relative coordinates of the barcode patterns, detects the barcode types of the barcode patterns and the relative coordinates of the barcode patterns according to the barcode forms and the relative configuration orientations to identify from the barcode patterns a predetermined number of barcode patterns to be outputted matching the barcode forms and the relative configuration orientations, and decodes the barcode patterns to be outputted to obtain information respectively represented by the barcode patterns to be outputted. The display unit outputs the information obtained.

In conclusion of the above, in the method for scanning multiple barcodes and the system thereof according to one embodiment of the present invention, instead of having to manually perform scanning in sequence, information required can be obtained by one-time comparison of a single tag image each time when multiple barcodes need to be scanned. In the method for scanning multiple barcodes and the system thereof according to one embodiment of the present invention, the information in multiple barcodes can be sorted and outputted according to requirements. The method for scanning multiple barcodes and the system thereof according to one embodiment of the present invention provide a faster and more convenient scanning means compared to the prior art, and are capable of reducing errors caused by human factors.

DETAILED DESCRIPTION OF THE EMBODIMENTS

Figure 1:
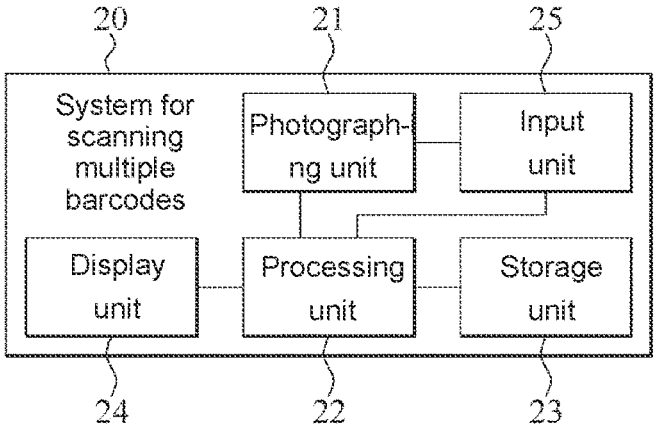
FIG. 1 is a block diagram of a system for scanning multiple barcodes according to an embodiment of the present invention.

Referring to FIG. 1, a system 20 for scanning multiple barcodes includes a photographing unit 21, a processing unit 22, a storage unit 23 and a display unit 24. The photographing unit 21, the storage unit 23 and the display unit 24 are all coupled to the processing unit 22.

Figure 2:
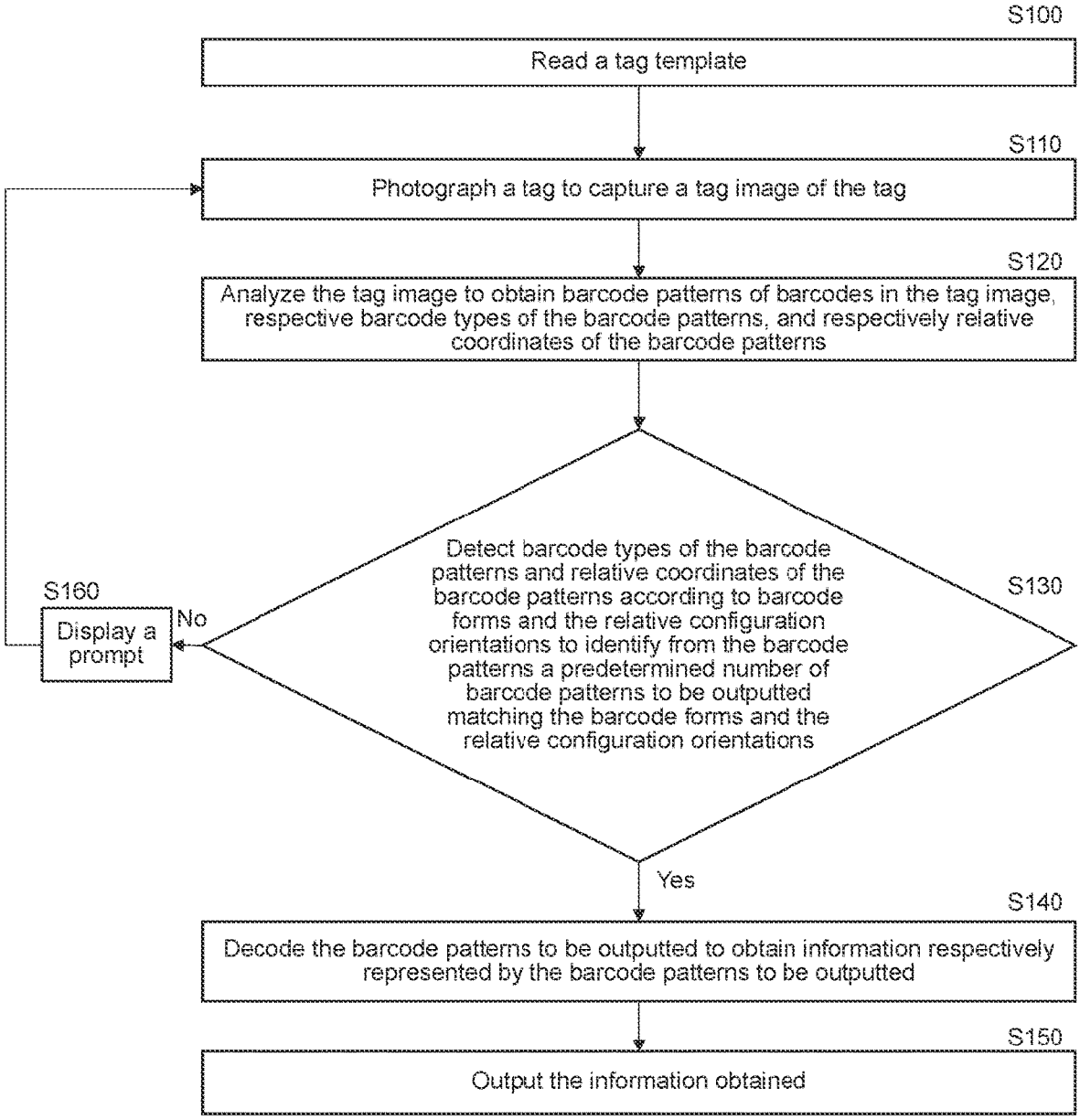
FIG. 2 is a flowchart of a method for scanning multiple barcodes according to an embodiment of the present invention.

Refer to FIG. 2. In an operation process of the system 20 for scanning multiple barcodes, the processing unit 22 first reads a tag template T (step S100).

Figure 3:
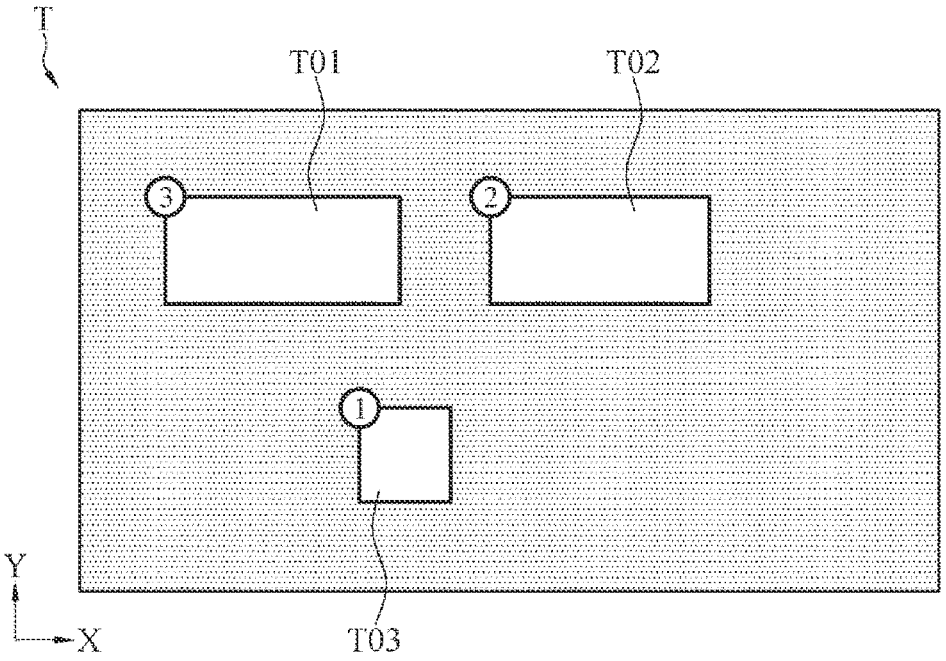
FIG. 3 is a schematic diagram of setting a tag template according to an embodiment of the present invention.

Refer to FIG. 3. The storage unit 23 stores the tag template T, which records a predetermined number of barcode form T01, barcode form T02 and barcode T03 as well as relative configuration orientations thereof, wherein the predetermined number is a positive integer and is greater than 1. In one embodiment, the barcode forms further include barcode types, for example, one-dimensional barcodes or two-dimensional barcodes. A one-dimensional barcode can at a time represent information of tens of characters, and a two-dimensional barcode can even represent information of thousands of characters. In one embodiment, the tag template T further records an output sequence of barcode forms. In one example, when the barcode form T03 has a sorting sequence 1, it means that information included in the barcode form T03 is prioritized to be outputted. In another example, when the barcode form T03 has a sorting sequence 1, it means that information included in the barcode form T03 is prioritized to be read and outputted.

The term "relative configuration orientation" herein refers to an orientation relationship between two different barcode forms, wherein the orientation relationship is obtained by comparison. In one embodiment, the relative configuration orientation can be represented by a relative relationship of coordinates of barcode forms. In one embodiment, the relative configuration orientation can be defined according to coordinate values of barcode forms. In one embodiment, the relative configuration orientation can be defined according to a relationship between the X-coordinate values and the Y-coordinate values of a barcode form. For example, the X-coordinate value of the barcode form T02 is greater than the X-coordinate value of the barcode form T01. In one embodiment, the relative configuration orientation can be defined according to a distance ratio of barcode forms. For example, a ratio of the value of the X-coordinate value of the barcode from T02 subtracted by the X-coordinate value of the barcode form T01 to the value of the X-coordinate value of the barcode form T01 subtracted by the X-coordinate value of the barcode form T03 is 1:2.

Again refer to FIG. 3. In one example, the tag templates T records a predetermined number, which is three, of barcode forms T01/T02/T03, and the barcode types of the barcode form T01 and the barcode form T02 are one-dimensional barcodes, and barcode type of the barcode form T03 is a two-dimensional barcode. The X-coordinate of the barcode form T01 is represented by T01X, and the Y-coordinate is represented by T01Y; and so forth. At this point, a value sequence of the barcode forms T01/T02/T03 according to the X-coordinate values is T02X>T03X>T01, and a value sequence of the barcode forms T01/T02/T03 according to the Y-coordinate values is T01Y=T02Y>T03Y, accordingly forming the relative configuration orientations of the barcode forms.

Figure 4:
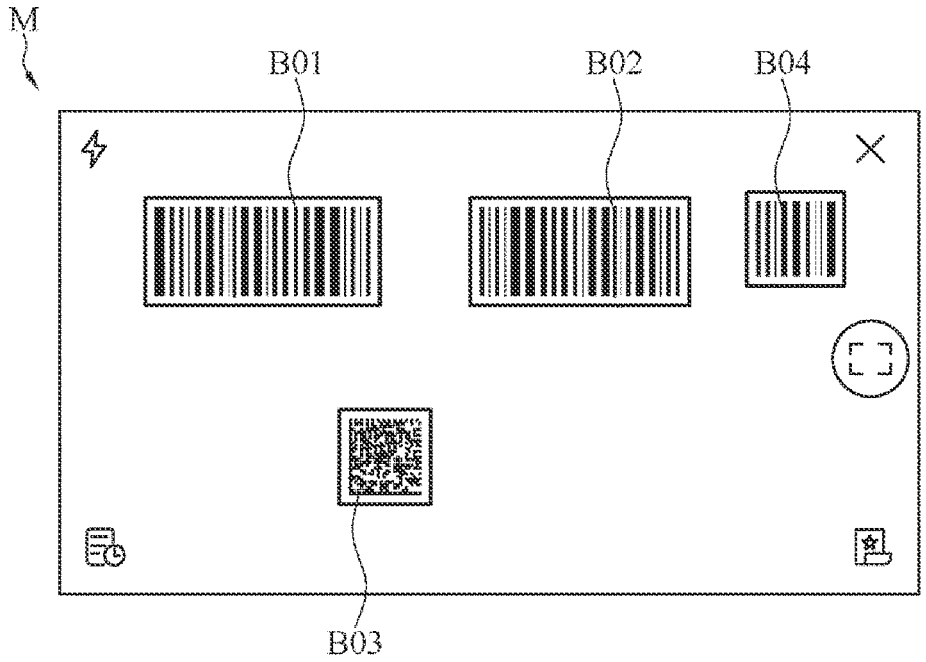
FIG. 4 is a schematic diagram of a tag image according to another embodiment of the present invention.

Refer to FIG. 2 and FIG. 4. The photographing unit 21 photographs a tag to capture a tag image M of the tag (step S110). In one embodiment, the photographing unit 21 can be implemented by a camera, a video camera or other image capturing devices. In one example, the photographing unit 21 photographs the tag to capture the tag image M of the tag. For example, the tag refers to an appearance of a product container, on which a plurality of barcodes representing information of production origins or prices are attached/printed. In the example, the tag image M includes a barcode B01 and a barcode B02 that are one-dimensional barcodes, and a barcode B03 that is a two-dimensional barcode, and the barcodes are distributed on different positions in the tag image M.

Again refer to FIG. 2. The processing unit 22 analyzes the tag image M to obtain barcode patterns of all the barcodes B01/B02/B03 in the tag image M, the barcode types of the barcode patterns, and relative coordinates of the barcode patterns (step S120). In one embodiment, the processing unit 22 determines by means of image recognition whether the tag image M includes barcode patterns, and records the types of the barcode patterns and the coordinates of each barcode pattern.

Next, the processing unit 22 detects the barcode types of the barcode patterns in the tag image M and relative coordinates of the barcode patterns according to the barcode forms and the relative configuration orientations included in the tag template T, so as to determine whether the barcode patterns include a predetermined number of barcode patterns to be outputted matching the barcode forms and the relative configuration orientations (step S130). In short, the processing unit 22 compares the tag template T with the tag image M; if all or a part of the barcode patterns in the tag image M match the tag template, the processing unit 22 labels the matching barcode patterns as barcode patterns to be outputted.

In one embodiment, if the barcode patterns in the tag image M do not match the tag template, the processing 22 causes the display unit 24 to display a prompt (step S160), for example, displaying prompt information such as "template not matched". In another embodiment, if the barcode patterns in the tag image M do not match the tag template, step S110 is iterated (that is, the processing unit 22 drives the photographing unit 21 to again photograph the tag). In one embodiment, if the barcode patterns in the tag image M do not match the tag template, a prompt is first displayed and then step S110 is iterated. Thus, a situation where step S130 cannot be successfully performed due to a photographing error of the tag can be avoided.

Figure 5:
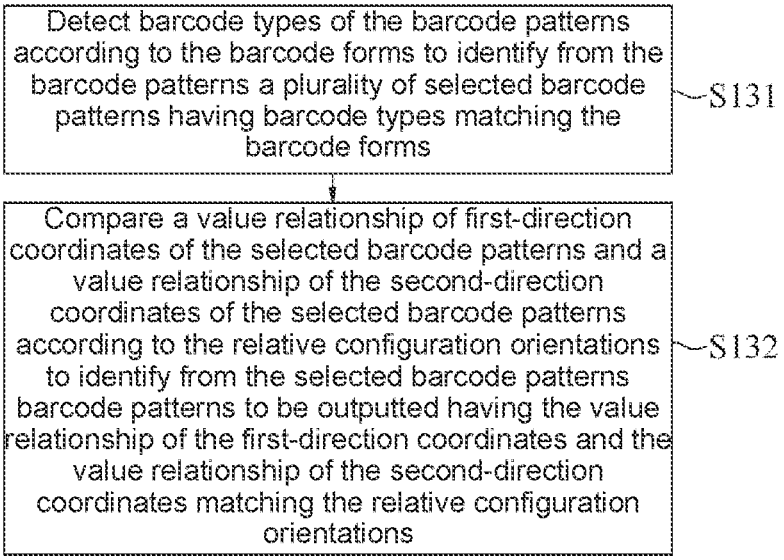
FIG. 5 is a partial flowchart of a method for scanning multiple barcodes according to an embodiment of the present invention.

Refer to FIG. 5. In step S130 according to an embodiment, the relative coordinates of a barcode pattern include a first-direction coordinate and a second-direction coordinate, and the processing unit 22 detects the barcode types of the barcode patterns according to the barcode forms so as to identify from the barcode patterns a plurality of selected barcode patterns matching the barcode forms (step S131), and compares a value relationship of the first-direction coordinates of the selected barcode patterns and a value relationship of the second-direction coordinates of the selected barcode patterns to identify from the selected barcode patterns the barcode patterns to be outputted having the value relationship of the first-direction coordinates and the value relationship of the second-direction coordinates matching the relative configuration orientations (step S132).

In one example, the processing unit 22 compares for three conditions during the comparison process of the tag template T and the tag image M. The first condition is that the barcode form needs to be the same as the barcode type of the barcode pattern, the second condition is that the value relationship between the first-direction coordinate of the barcode form and the first-direction coordinate of the barcode pattern is compared to match the tag template T, and the third condition is that the value relationship between the second-direction coordinate of the barcode form and the second-direction coordinate of the barcode pattern is compared to match the tag template T. In the comparison process, all of the three conditions above need to be satisfied; however, the comparison of the three conditions above does not need to be performed according to the above sequence.

Figure 6:
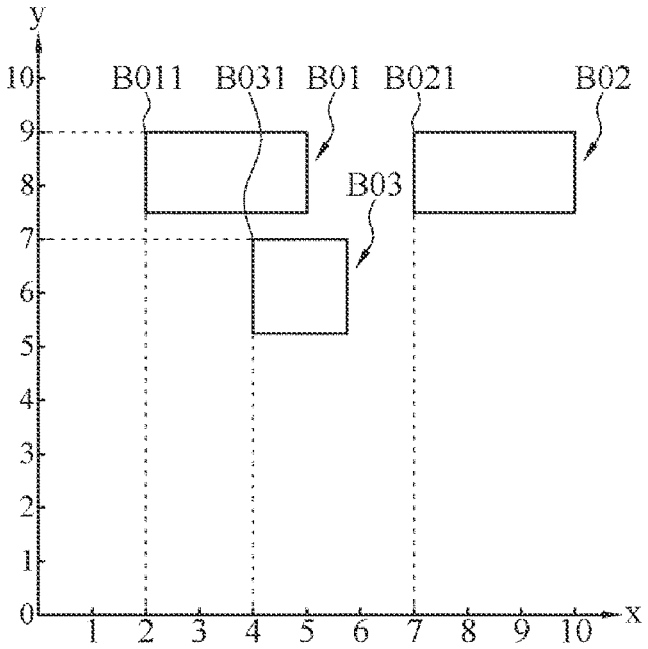
FIG. 6 is a schematic diagram of a tag image and coordinates according to an embodiment of the present invention.

Refer to FIG. 6. In one embodiment, the first-direction coordinate and the second-direction coordinate refer to coordinates of a fixed endpoint in the barcode pattern. For example, when the barcode pattern B01 is a quadrilateral, the barcode pattern B01 can use an endpoint B011 at the upper-left corner as a calculation point for the first-direction coordinate X and the second-direction coordinate Y; that is to say, the first-direction coordinate X of the barcode pattern B01 is 2 and the second-direction coordinate Y of the barcode pattern B01 is 9, and the coordinates of the barcode pattern B01 are represented by (2, 9) herein. The barcode pattern B02 can use an endpoint B021 at the upper-left corner as a calculation point for the first-direction coordinate X and the second-direction coordinate Y; that is to say, the first-direction coordinate X of the barcode pattern B02 is 7 and the second-direction coordinate Y of the barcode pattern B02 is 9, and the coordinates of the barcode pattern B02 are represented by (7, 9) herein. The barcode pattern B03 can use an endpoint B031 at the upper-left corner as a calculation point for the first-direction coordinate X and the second-direction coordinate Y; that is to say, the first-direction coordinate X of the barcode pattern B03 is 4 and the second-direction coordinate Y of the barcode pattern B03 is 7, and the coordinates of the barcode pattern B03 are represented by (4, 7) herein.

Refer to FIG. 5. In an example of step S131, when the tag template T is activated to detect the tag image M, the processing unit 22 compares whether the barcode pattern B01 is a one-dimensional barcode, whether the barcode pattern B02 is a one-dimensional barcode, and whether the barcode pattern B03 is a two-dimensional barcode; the processing unit 22 further determines that the coordinates of the barcode pattern B01 are (2, 9), the coordinates of the barcode pattern B02 are (7, 9), and the coordinates of the barcode pattern B03 are (7, 6); the processing unit 22 compares the X-coordinates of the barcode patterns B01/B02/B03 to obtain that 7>4>2, which satisfies the condition of T02X>T03X>T01X, compares the Y-coordinates of the barcode patterns B01/B02/B03 to obtain that 9=9>7, which satisfies the condition of T01Y=T02Y>T03Y, and thus determines the barcode patterns B01/B02/B03 as barcode patterns to be outputted.

Figure 7:
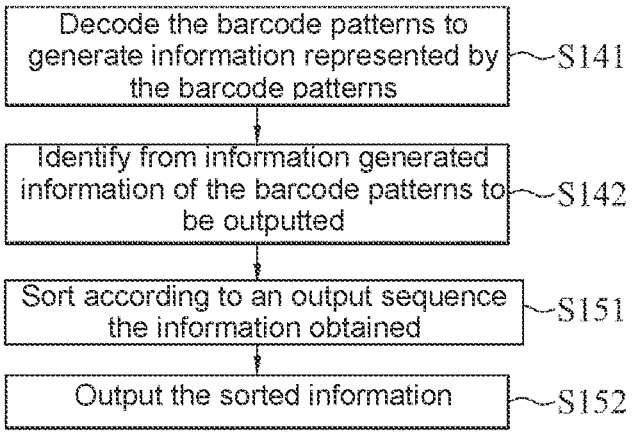
FIG. 7 is a partial flowchart of a method for scanning multiple barcodes according to an embodiment of the present invention.

Again refer to FIG. 2 and FIG. 7. The processing unit 22 decodes the barcode patterns to be outputted to obtain information respectively represented by the barcode patterns to be outputted (step S140). The processing unit 22 outputs the information obtained (step S150), for example, displaying the information obtained on the display unit 24.

In step S140 according to an embodiment, step S140 includes decoding the barcode patterns to generate the information represented by the barcode patterns (step S141), and identifying from the information generated the information of the barcode patterns to be outputted (step S142). Taking the tag image M in FIG. 4 for example, after obtaining the tag image M, the processing unit 22 can decode all of the barcode pattern B01, the barcode pattern B02, the barcode pattern B03 and the barcode pattern B04, and store the information obtained from decoding in the storage unit 23. Because the barcode pattern B01, the barcode pattern B02 and the barcode pattern B03 are the barcode patterns to be outputted, the processing unit 22 outputs only the information obtained from decoding the barcode pattern B01, the barcode pattern B02 and the barcode pattern B03.

In step S150 according to an embodiment, the processing unit 22 sorts according to an output sequence the information obtained (step S151), and outputs the sorted information (step S152). In continuation of the above example, when the information obtained from decoding the barcode pattern B01, the barcode pattern B02 and the barcode pattern B03 is to be outputted, the processing unit 22 outputs the information according to a corresponding output sequence in the tag template T in FIG. 3. For example, the barcode pattern B03 corresponds to the barcode form T03 and the barcode form T03 has an output sequence 1 in the tag template T, and therefore the information obtained from decoding the barcode pattern B03 is prioritized to be displayed on the display unit 24.

In one embodiment, the system 20 for scanning multiple barcodes includes an input unit 25, which is connected to the processing unit 22. Before step S110, the input unit 25 receives a plurality of selection signals, and the processing unit 22 generates the tag template T according to the selection signals. In some embodiments, the display unit 24 can concurrently have an input function. For example, the display unit 24 having an input function can be implemented by a touch screen. In one embodiment, the display unit 24 and the input unit 25 exist as one single element, that is, operations of the display unit 24 and the input unit 25 can be simultaneously achieved by one single element. In one embodiment, the display unit 24 and the input unit 25 exist as separate elements.

Figure 8:
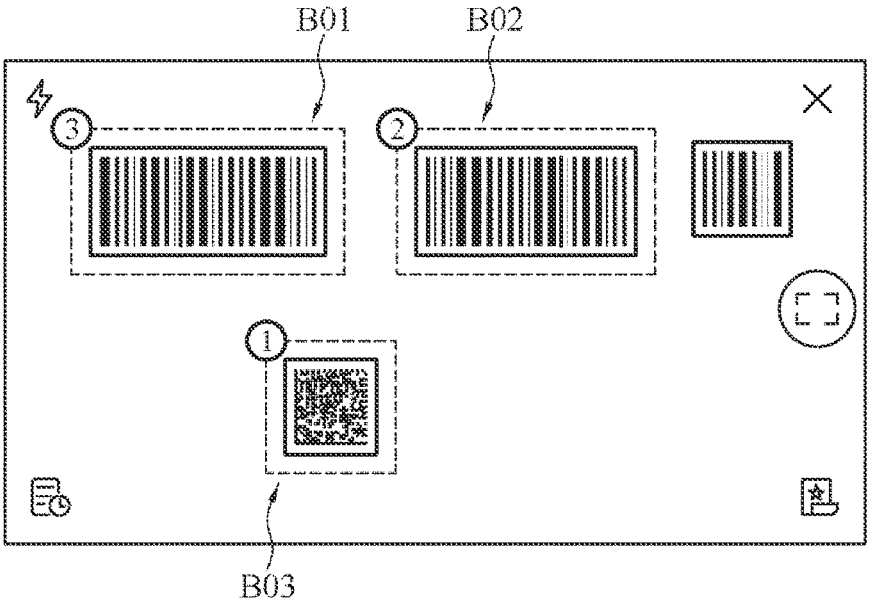
FIG. 8 is a schematic diagram of scanning barcode patterns according to an embodiment of the present invention.

Refer to FIG. 8. For example, the input unit 25 is a touch screen, the system 20 for scanning multiple barcodes has a setting mode, and the tag image M is displayed on a touch panel when the photographing unit 21 photographs the tag and captures the tag image M of the tag under the setting mode. As shown in FIG. 4, a user sequentially touches and selects the barcode pattern B03 on the touch screen to generate a first selection signal, touches and selects the barcode pattern B02 to generate a second selection signal, and touches and selects the barcode pattern B01 to generate a third selection signal. The processing unit 22 generates a predetermined number, which is 3, of barcode forms T01/T02/T03 according to the first selection to the third selection signal, records the relative configuration orientations generated according to the barcode types and relative coordinates of the barcode patterns B01 to B03 to generate the tag template T, and stores the tag template T in the storage unit 23.

In one embodiment, the processing unit 22 further generates an output sequence according to a generation sequence of the first selection signal, the second selection signal and the third selection signal, and forms the tag template T on the basis of the output sequence, the barcode forms and the relative configuration orientations.

In some embodiments, the processing unit 22 can be, for example but not limited to, a central processing unit (CPU), a system-on-chip (SoC), a microcontroller unit (MCU), an integrated circuit (IC) or a microprocessor.

In some embodiments, the storage unit 23 can be implemented by one or more storage elements. Each storage element can be a non-volatile memory such as a read-only memory (ROM) or a flash memory, or a volatile memory such as a random-access memory (RAM).

In some embodiments, the system 20 for scanning multiple barcodes can be implemented by a smartphone or a tablet computer. That is to say, the processing unit 22 includes an application (commonly referred to as an App), and performs the method for scanning multiple barcodes by the application.

It should be noted that, although the steps are described in the above sequences, it is to be noted that the sequences are not a limitation to the present invention, and a person skilled in the art can understand that the sequences for performing the steps can be concurrent or swapped under reasonable circumstances.

While the technical contents of the present invention have been disclosed above by way of the preferred embodiments, it is to be understood that the present invention is not limited thereto. Variations and modifications made by a person skilled in the art without departing from the spirit are to be encompassed within the scope of the present invention. Therefore, the protection scope of present invention should to be accorded with definitions of the appended claims.

What is claimed is:

1. A method for scanning *a tag having* multiple barcodes, comprising:

reading a tag template, wherein the tag template records a plurality number of barcode forms and relative configuration orientations of the barcode forms;

[photographing a tag to capture] *capturing* a tag image of the tag, wherein a surface of the tag comprises a plurality of barcodes;

analyzing the tag image *of the tag* to obtain barcode patterns of the barcodes in the tag image, respective barcode types of the barcode patterns, and respective relative coordinates of the barcode patterns;

detecting the barcode types of the barcode patterns and the relative coordinates of the barcode patterns according to the barcode forms and the relative configuration orientations to identify from the barcode patterns a plurality of barcode patterns to be outputted matching the barcode forms and the relative configuration orientations;

decoding the barcode patterns to be outputted to obtain information respectively represented by the barcode patterns to be outputted; and outputting the information obtained.

2. The method for scanning *the tag having* multiple barcodes according to claim 1, wherein the tag template records an output sequence of the barcode forms; the method for scanning multiple barcodes further comprising:

before the step of outputting the information obtained, sorting the information obtained according to the output sequence;

wherein, the step of outputting the information obtained comprises outputting the sorted information.

3. The method for scanning *the tag having* multiple barcodes according to claim 1, wherein the relative coordinates of each of the barcode patterns comprise a first-direction coordinate and a second-direction coordinate, and the step of detecting the barcode types of the barcode patterns and the relative coordinates of the barcode patterns according to the barcode forms and the relative configuration orientations to identify from the barcode patterns the plurality of barcode patterns to be outputted matching the barcode forms and the relative configuration orientations comprises:

detecting the barcode types of the barcode patterns according to the barcode forms to identify from the barcode patterns a plurality selected barcode patterns having the barcode types matching the barcode forms; and comparing a value relationship of the first-direction coordinates of the selected barcode patterns and a value relationship of the second-direction coordinates of the selected barcode patterns according to the relative configuration orientations to identify from the selected barcode patterns the barcode patterns to be outputted having the value relationship of the first-direction coordinates and the value relationship of the second-direction coordinates matching the relative configuration orientations.

4. The method for scanning *the tag having* multiple barcodes according to claim 1, wherein the step of decoding the barcode patterns to be outputted to obtain the information respectively represented by the barcode patterns to be outputted comprises:

decoding the barcode patterns to generate the information represented by the barcode patterns; and identifying from the information generated the information of the barcode patterns to be outputted.

5. The method for scanning multiple barcodes according to claim 1, wherein [the step of photographing the tag to capture] *capturing* the tag image of the tag comprises photographing the tag by a photographing unit to capture the tag image of the tag.

6. A system for scanning multiple barcodes, comprising:

a storage unit, storing a tag template, wherein the tag template records a plurality number of barcode forms and relative configuration orientations of the barcode forms;

a photographing unit[, photographing a tag] to capture a tag image of the tag;

a processing unit, coupled to the storage unit and the photographing unit, *to:*

[reading] *read* the tag template, [analyzing] *analyze* the tag image to obtain barcode patterns of the barcodes in the tag image, respective barcode types of the barcode patterns, and respective relative coordinates of the barcode patterns;

[the processing unit detecting] *detect* the barcode types of the barcode patterns and the relative coordinates of the barcode patterns according to the barcode forms and the relative configuration orientations to identify from the barcode patterns a plurality of barcode patterns to be outputted matching the barcode forms and the relative configuration orientations;

[the processing unit decoding] *decode* the barcode patterns to be outputted to obtain information respectively represented by the barcode patterns to be outputted; and a display unit[, outputting] *to output* the information obtained.

7. The system for scanning multiple barcodes according to claim 6, wherein the tag template [records] *is to record* an output sequence of the barcode forms, the processing unit further [sorts] *is to sort* the information obtained according to the output sequence, and the display unit [displays] *is to* the information sorted according to the output sequence.

8. The system for scanning multiple barcodes according to claim 6, wherein:

the relative coordinates of each of the barcode patterns comprise a first-direction coordinate and a second-direction coordinate;

[in the step of detecting] *and wherein to detect* the barcode types of the barcode patterns and the relative coordinates of the barcode patterns according to the barcode forms and the relative configuration orientations to identify from the barcode patterns the plurality of barcode patterns to be outputted matching the barcode forms and the relative configuration orientations, the processing unit [detects] *is to detect* the barcode types of the barcode patterns according to the barcode forms to identify from the barcode patterns a plurality selected barcode patterns having the barcode types matching the barcode forms, and [compares] *compare* a value relationship of the first-direction coordinates of the selected barcode patterns and a value relationship of the second-direction coordinates of the selected barcode patterns according to the relative configuration orientations to identify from the selected barcode patterns the barcode patterns to be outputted having the value relationship of the first-direction coordinates and the value relationship of the second-direction coordinates matching the relative configuration orientations.

9. The system for scanning multiple barcodes according to claim 6, wherein [in the step of decoding] *to decode* the barcode patterns to be outputted to obtain the information respectively represented by the barcode patterns to be outputted, the processing unit [decodes] *is to decode* the barcode patterns to generate the information represented by the barcode patterns, and [identifies] *identify* from the information generated the information of the barcode patterns to be outputted.

*10. A system for scanning a tag having multiple barcodes, comprising:*

*a processing unit to:*

*read a tag template, wherein the tag template records a plurality number of barcode forms and relative configuration orientations of the barcode forms;*

*capture a tag image of the tag, wherein a surface of the tag comprises a plurality of barcodes;*

*analyze the tag image of the tag to obtain barcode patterns of the plurality of barcodes, respective barcode types of the barcode patterns, and respective relative coordinates of the barcode patterns;*

*detect the barcode types of the barcode patterns and the relative coordinates of the barcode patterns according to the barcode forms and the relative configuration orientations to identify from the barcode patterns a plurality of barcode patterns to be outputted matching the barcode forms and the relative configuration orientations;*

*decode the barcode patterns to be outputted to obtain information respectively represented by the barcode patterns to be outputted; and*

*output the information obtained.*

*11. The system according to claim 10, wherein the tag template is to record an output sequence of the barcode forms, wherein the processing unit is further to:*

*before the information obtained is output, sort the information obtained according to the output sequence;*

*wherein to output the information obtained, the processing unit is to output the sorted information.*

*12. The system according to claim 10, wherein the relative coordinates of each of the barcode patterns comprise a first-direction coordinate and a second-direction coordinate, and wherein to detect the barcode types of the barcode patterns and the relative coordinates of the barcode patterns according to the barcode forms and the relative configuration orientations to identify from the barcode patterns the plurality of barcode patterns to be outputted matching the barcode forms and the relative configuration orientations, the processing unit is further to:*

*detect the barcode types of the barcode patterns according to the barcode forms to identify from the barcode patterns a plurality selected barcode patterns having the barcode types matching the barcode forms; and*

*compare a value relationship of the first-direction coordinates of the selected barcode patterns and a value relationship of the second-direction coordinates of the selected barcode patterns according to the relative configuration orientations to identify from the selected barcode patterns the barcode patterns to be outputted having the value relationship of the first-direction coordinates and the value relationship of the second-direction coordinates matching the relative configuration orientations.*

*13. The system according to claim 10, wherein to decode the barcode patterns to be outputted to obtain the information respectively represented by the barcode patterns to be outputted, the processing unit is further to:*

*decode the barcode patterns to generate the information represented by the barcode patterns; and*

*identify from the information generated the information of the barcode patterns to be outputted.*

*14. The system according to claim 10, further comprising:*

*a photographing unit to capture the tag image of the tag.*

* * * * *